SECRECY COMMUNICATION SYSTEM

Filed May 23, 1957 2 Sheets-Sheet 1

Inventors
Walter S. Druz
John G. van Bosse
By John J. Pederson
Attorney

SECRECY COMMUNICATION SYSTEM

Filed May 23, 1957

2 Sheets-Sheet 2

Inventors
Walter S. Druz
John G. Van Bosse
By John J. Pederson
Attorney

2,993,959
SECRECY COMMUNICATION SYSTEM

Walter S. Druz, Bensenville, and John G. van Bosse, Oak Park, Ill., assignors to Zenith Radio Corporation, a corporation of Delaware Filed May 23, 1957, Ser. No. 661,167
6 Claims. (Cl. 179—1.5)

This invention pertains to secrecy communication systems in which an intelligence signal is transmitted in coded form to be utilized only in a receiver equipped with a decoding device controlled in accordance with the coding schedule employed at the transmitter. More particularly, the invention relates to a novel apparatus for use in such a secrecy communication system to prevent transient distortion attributable to transmission band width limitations and to the decoding operation, without introducing undesired noise distortion. The novel arrangement of the present invention is particularly attractive when incorporated into the audio decoding portion of a subscription television receiver and for that reason is described in such an environment.

Most secrecy systems in which an intelligence signal, such as an audio signal, is coded or scrambled by altering one of its characteristics, for example phase, from time to time at mode-changing intervals in accordance with a secret code schedule do achieve adequate scrambling of the intelligence signal. Unfortunately, however, there may result from such a coding process distortion that may be charged to the limited band width allotted to audio transmission which prevents the translation of the entire range of frequency components representing the extremely sharp amplitude excursions of the coded audio signal produced by the phase inversions in the coding operation; almost an infinite band width could actually be required to duplicate such abrupt changes. Consequently, it is difficult in effecting compensating phase inversions in the decoding process at the receiver to avoid transient distortion pulses. Moreover, the compensating phase changes effected in the decoding apparatus at the receiver do not always occur in exact time coincidence with the corresponding phase changes at the transmitter. Consequently, additional undesirable transient pulses are generated and are also reflected as transient distortion in the decoded audio signal.

Such transient distortion, of course, detracts from the fidelity or quality of reproduction of the decoded intelligence signal, but since the distortion occurs essentially at the instants of phase inversion in the decoding process, it may be effectively removed by interposing a sampling circuit and a wave-shaping network, in the form of a low-pass filter, in the audio channel in accordance with the teachings of copending application Serial No. 397,176, filed December 9, 1953, and issued March 22, 1960, as Patent 2,929,865 in the name of Howard K. Van Jepmond, and assigned to the present assignee. The operation of the sampler may be so phased with respect to the code schedule that the decoded audio signal is only sampled (by the use of a super-audible, periodically recurring sampling signal) at times other than the instants of phase inversions. In this way, the decoded or unscrambled signal is sampled or examined only during those intervals when no transient distortion is present. The sampled signal is then shaped in the low-pass filter to remove the sampling frequency component, producing a distortion-free simulation of the original uncoded signal.

Even though the sampling arrangement specifically described in the copending Van Jepmond application does eliminate the distortion resulting from the transmission band width limitations, for best performance it is preferable in that prior system to provide in the receiver audio translating stages that reproduce a relatively wide range of frequencies in order that the phase inversions of the received coded signal are as sharp and as steep as possible. This is necessary to confine the phase inversions and the transient distortion to relatively short intervals of time so that the sampling process is most effective.

Thus, for optimum results, it is essential in the system described in the Van Jepmond application to employ relatively wide band receiver audio stages which respond to frequencies not only in the audible range but substantially beyond that range. As an incident to such wide band reception, it is possible that unwanted super-audible or supersonic high frequency transmission noise components may also be accepted, particularly in a weak signal area. Moreover, when the sound translating stages are incorporated in a television receiver of the intercarrier type, low frequency video or picture signal components may be present in the intercarrier sound signal and will likewise be translated through the wide band audio stages. These transmission noise and video components (both of which may be called extraneous noise components herein inasmuch as they are not part of the audio signal), being above the audible range, would not ordinarily introduce any audible distortion. However, since the sampling function in the receiver is actually a modulation or demodulation function, the undesired extraneous noise components are beat, demodulated or heterodyned down by the relatively high frequency sampling signal into the audible range. Consequently, the objectionable noise components may be heard in the decoded audio signal.

Copending application Serial No. 639,996, filed February 13, 1957, in the name of Walter S. Druz et al., and assigned to the present assignee, discloses one arrangement for achieving the favorable results of the Van Jepmond sampling scheme while at the same time minimizing the undesirable heterodyning effects. Briefly, this is realized by providing two translating channels between the output of the audio decoder and an electronic selector switch which in turn has its output coupled through an audio amplifier to a speaker. One channel includes the Van Jepmond type sampling arrangement so that one signal supplied to the selector switch is a substantial simulation of the decoded audio signal with the undesired transient distortion removed but including the undesired high frequency noise components which have been demodulated into the audible range due to the demodulation effect of the sampler. The other channel supplies the output signal of the audio decoder unaltered to the selector; such a signal, while not containing any audible noise distortion, does include the transient distortion during the phase inversion or mode-changing intervals. A selecting signal is developed consisting of a series of pulses each of which effectively anticipates and embraces an assigned mode-changing interval, and is utilized to select the output of the sampler only during the mode-changing intervals while the output of the decoder is selected during the intervening intervals. In this way, the signal developed at the output of the selector, and eventually supplied to the speaker, is devoid of the transient distortion and, moreover, contains a minimum, in point of time, of the extraneous noise components that have been demodulated down into the audible range.

The Druz et al. system does successfully meet the problem of minimizing the undesired heterodyning effects while at the same time practicing the Van Jepmond invention. However, a considerable increase in circuitry is required, resulting in a corresponding increase in cost of the receiver equipment. The present invention provides an arrangement that also overcomes this problem except that it requires considerably less circuitry than the prior Druz et al. disclosure.

It is, accordingly, an object of the present invention to provide an improved secrecy communication system of the type disclosed in the above-identified Van Jepmond and Druz et al. applications.

It is another object of the invention to provide an improved secrecy communication receiver wherein there is produced a decoded intelligence signal substantially free of transient distortion and extraneous audible noise components.

It is still another object of the invention to provide an audio decoding arrangement for a subscription television receiver for producing a distortion-free and noise-free unscrambled audio signal.

A secrecy communication receiver, constructed in accordance with the present invention, comprises a source of coded intelligence signal having desired components occupying a predetermined portion of the frequency spectrum and subject to the introduction of undesired noise components exhibiting frequencies above the predetermined portion. Decoding apparatus is coupled to the source for varying from time to time a characteristic of the coded intelligence signal between a plurality of different modes in accordance with a predetermined code schedule to develop a decoded intelligence signal, also containing the undesired high frequency noise components, with the transitions during the spaced mode-changing occurrences subject to introducing undesired transient distortion occupying finite time intervals in the decoded intelligence signal and partially represented by frequency components lying above the predetermined portion of the spectrum. Sampling means is coupled to the decoding apparatus for effecting sampling of the decoded intelligence signal at a sampling rate higher than the upper frequency limit of the predetermined portion of the frequency spectrum and only at spaced sampling time intervals different from the mode-changing occurrences to develop an output signal that is a substantial simulation of the decoded intelligence signal with the undesired transient distortion removed except that it is subject to the unwanted heterodyning of the undesired high frequency noise components into the predetermined portion of the frequency spectrum due to the demodulation effect of the sampling means. Finally, the secrecy communication receiver comprises a low-pass filter coupled between the decoding apparatus and sampling means for attenuating at least some of the undesired high frequency noise components to minimize the unwanted heterodyning of the noise components in the sampling means, some of the transient distortion components in the decoded intelligence signal also thereby being attenuated giving rise to a broadening of the time intervals occupied by the transient distortion not exceeding the time separations between the sampling intervals.

The features of this invention which are believed to be new are set forth with particularity in the appended claims. The invention, together with further objects and advantages thereof, may best be understood, however, by reference to the following description in conjunction with the accompanying drawings, in which:

Figure 1:
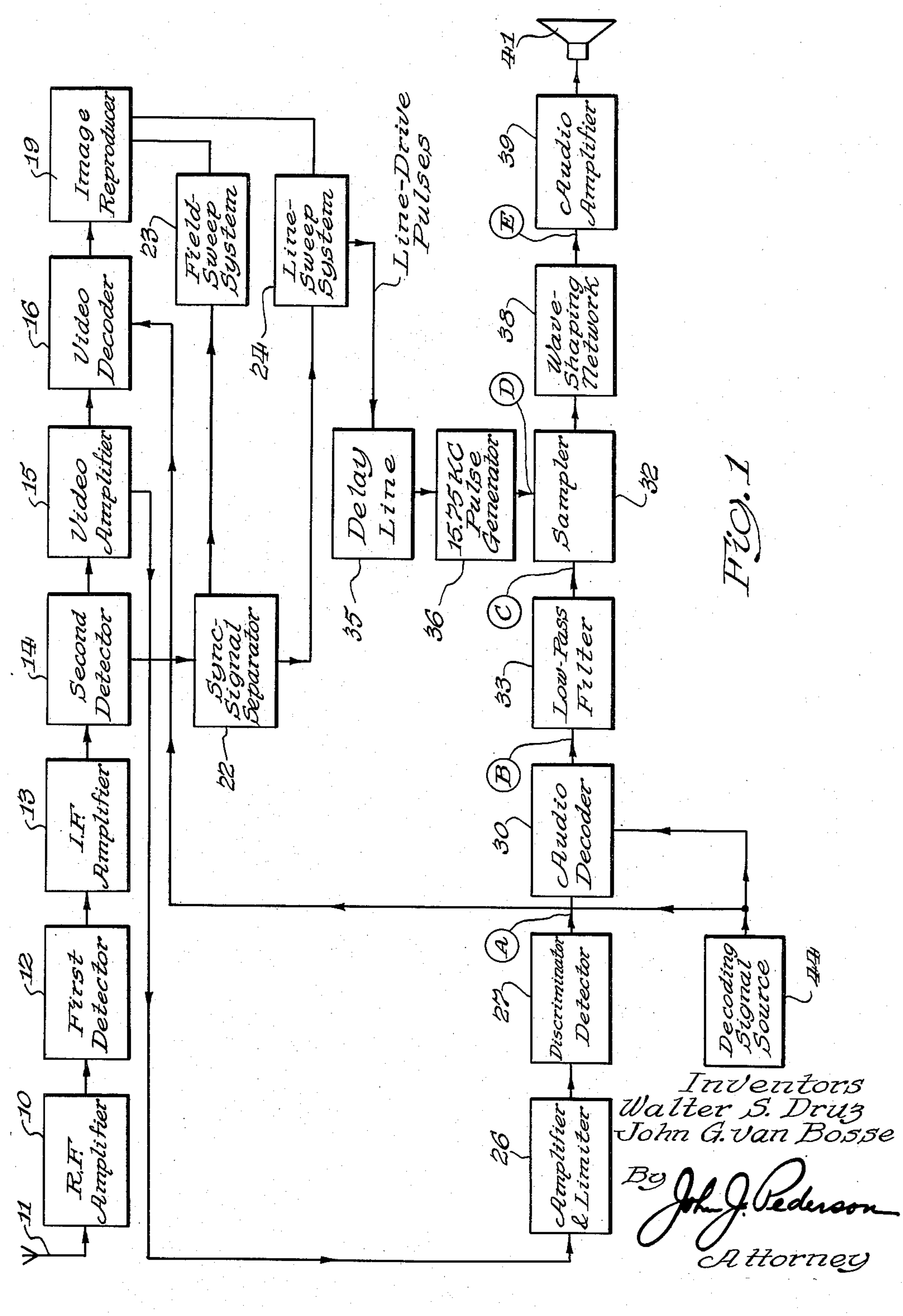
FIGURE 1 is a schematic representation of a secrecy communication receiver, specifically a subscription television receiver, constructed in accordance with the invention.

The receiver illustrated in FIGURE 1 is constructed to utilize the telecast originating at a transmitter of the type described in copending application Serial No. 366,727, filed July 8, 1953, and issued September 16, 1958, as Patent 2,852,598, in the name of Erwin M. Roschke, and assigned to the present assignee. Briefly, in that application a 30:1 counting mechanism responds to periodically recurring line-drive pulses to develop a square wave coding signal having amplitude changes occurring during the line-retrace interval following each succession of 15 line-trace intervals. During the field-retrace intervals, coding pulses are developed and supplied to various input circuits of a bi-stable multivibrator to effect actuation thereof, preferably in random fashion. The counting mechanism is rephased during each field-retrace interval under the control of the bi-stable multivibrator and thus the square wave coding signal from the counter is effectively phase modulated in a random manner. In other words, the periodic actuation of the counting mechanism is interrupted during the field-retrace intervals to introduce discontinuities in the square wave. The phase modulated coding signal is employed to effect mode changes in the transmitter by alternately introducing and then removing a time delay of the video with respect to the synchronizing components. The coding pulses may be transmitted along with the video signal during the field-retrace intervals to facilitate the proper phasing of a similar square wave signal at the receiver for decoding purposes.

The phase modulated square wave coding signal is also used in the Roschke system to code the audio intelligence. This is accomplished by applying it to the deflection electrodes of a beam-deflection tube having a control grid, modulated in accordance with the uncoded audio intelligence, and a pair of collector anodes connected to opposite terminals of the primary winding of an output transformer. With this arrangement, the phase of the audio signal is effectively inverted at the secondary winding of the transformer each time the beam switches from one anode to the other, and this occurs each time there is an amplitude variation of the square wave coding signal.

The audio phase inversion process of the Roschke system is subject to the introduction of transient distortion since the mode changes may not occur in exact synchronism at the transmitter and receiver, and secondly the limited band width transmission precludes the reproduction of extremely sharp phase inversions. Consequently, the receiver of FIGURE 1 is generally similar to that shown in the Roschke application but is further adapted to prevent the introduction of any noise or transient components in the decoded audio signal.

More specifically, the receiver comprises a radio-frequency amplifier 10 having input terminals connected to an antenna circuit 11 and output terminals connected to a first detector 12. This detector is coupled through an intermediate frequency amplifier 13 to a second detector 14 which, in turn, is connected to the input circuit of a video amplifier 15. The output circuit of the video amplifier is connected through a video decoder 16 to the input electrodes of a cathode-ray image-reproducing device 19.

Decoder 16 may be similar to that disclosed and claimed in Patent 2,758,153, issued August 7, 1956, in the name of Robert Adler and assigned to the present assignee. In the system described in that patent, a beam-deflection tube has a pair of collector anodes connected respectively to a pair of output circuits which are selectively interposed into the video channel as the electron beam of the tube is deflected or switched from one to the other of the two anodes in synchronism with mode changes in the transmitter. As mentioned hereinbefore, these mode changes take the form of variations in timing of the video components relative to the synchronizing components of the received composite television signal. To compensate for these timing variations, the output circuit coupled to one anode includes a delay line while the output connected to the other anode does not. Consequently, the television signal is decoded as the beam of the deflection tube is switched between its anodes. Deflection of the beam is accomplished by a deflection-control or actuating signal applied to video decoder 16, in a manner to be explained.

Second detector 14 is also coupled to the input terminals of a synchronizing-signal separator 22 which is coupled, in turn, to a field-sweep system 23 and to a line-sweep system 24. The output terminals of sweep systems 23 and 24 are connected respectively to field- and line-deflection elements (not shown) associated with image reproducer 19.

Video amplifier 15 is also connected to an amplifier and amplitude limiter 26 which, in turn, is coupled to a discriminator detector 27 constructed to accept a relatively wide band of frequency components, both audible and superaudible, in order to reproduce the sharp phase inversions of the coded audio signal. As mentioned before, such abrupt changes are represented by relatively high frequency components lying above the audible range. Consequently, undesired high frequency noise is also accepted. The output terminals of detector 27 are connected to one pair of input terminals of an audio decoder 30. This decoder, as explained briefly hereinbefore and in detail in the aforementioned Roschke application, may comprise a beam-deflection device which is actuated in accordance with the coding schedule of the telecast to effect compensating phase inversions of the coded audio signal in order effectively to decode that signal.

Alternatively, audio decoder 30 may comprise a phase splitter and an electronic selector switch as shown in copending application Serial No. 513,757, filed June 7, 1955, and issued February 3, 1959, as Patent 2,872,507, in the name of Walter S. Druz, and assigned to the present assignee. In that application, the phase splitter supplies the coded audio signal to the electronic selector switch in push-pull relation, namely, with two different phases 180 degrees apart. The switch is actuated in accordance with the coding schedule to select certain portions of the two signals from the phase splitter.

Copending application Serial No. 440,224, filed June 29, 1954, and issued April 14, 1959 as Patent 2,882,398 in the name of Robert Adler, and assigned to the present assignee, also discloses an arrangement for achieving audio phase inversion.

The decoded audio signal developed in decoding device 30 contains transient distortion during the mode-changing intervals or occurrences and this is removed by connecting the output of decoder 30 to one pair of input terminals of a sampling device 32 through a low-pass filter 33. Filter 33, which constitutes an essential element of the present invention, will be described in more detail subsequently. Sampler 32 may be of any well known construction and may, for example, take either form of the sampling circuits described in the aforementioned Van Jepmond application. Line-drive pulses are derived from line-sweep system 24 and are applied to a pulse generator 36 through a delay line 35, which is constructed to introduce a time delay to an applied signal of approximately ½ of a line-trace interval for reasons to be explained. Generator 36, in turn, is connected to another input circuit of sampling device 32 to supply a 15.75 kilocycle pulse signal thereto, in order to effect sampling of the decoded audio signal developed in the output of decoder 30 at a 15.75 kilocycle rate. The output circuit of sampler 32 is coupled through a wave shaping network 38, such as a suitable low-pass filter, to an audio amplifier 39, the output terminals of which are connected to the input of a speaker 41.

In order to minimize the unwanted heterodyning of the high frequency noise components present in the coded audio signal developed in the output of discriminator detector 27, and consequently present in the decoded audio produced in the output of decoder 30, that may take place in sampler 32 due to its demodulation effect, low-pass filter 33, in accordance with the present invention, is employed to attenuate different ones of these noise components with various degrees of attenuation. The undesired transient distortion occupies finite time intervals in the decoded audio signal and is partially represented by high frequency components lying above the audible range. Low-pass filter 33 attenuates some of these high frequency components representing the transient distortion and consequently broadens the time intervals occupied by the transient distortion. Thus, there is a limit to the high frequency attenuation that may be effected by filter 33. It must not attenuate to the extent that the time intervals occupied by the transient distortion are broadened to exceed the time separations between sampling intervals. If that were the case, the remaining transient distortion would obviously not be removed.

Figure 2:
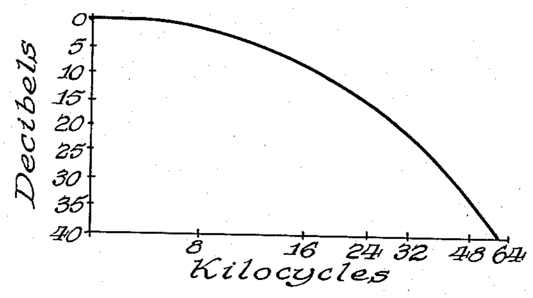
FIGURE 2 illustrates the frequency response characteristic of one of the components of FIGURE 1.

It has been found that excellent audio quality is obtained if low-pass filter 33 is constructed to exhibit a frequency response substantially as shown in FIGURE 2. It will be noted that the response rolls off gradually at its high end starting approximately at the highest frequency that will be recovered, namely, approximately 7.8 kilocycles which is one-half of the sampling frequency. Of course, in accordance with well known sampling theory, the highest frequency that may be recovered is one-half the sampling rate. The gradual roll off of the frequency response characteristic is preferable in order that the filter exhibit a substantial linear frequency-phase characteristic. With such a filter, the roll-off point (about 7.8 kc.) is still sufficiently high that the desired audio intelligence is translated, and yet the roll-off point is low enough that most of the noise components are attenuated.

In order to produce a deflection-control signal for video decoder 16 and audio decoder 30, a control mechanism or decoding signal source 44 is connected to both decoder 16 and decoder 30. Decoding signal source 44 provides to these decoders a square wave decoding signal, exhibiting amplitude variations during selected line-retrace intervals representing the coding schedule of the telecast, which is identical to that supplied to the corresponding circuits at the transmitter of the aforementioned Roschke application, Serial No. 366,727. Of course, the manner in which the coding signals at the transmitter and the corresponding decoding signal at each receiver are developed is entirely immaterial to the present invention. For this reason, source 44 has been shown merely as one block in the drawing for the sake of simplicity. For example, in accordance with the Roschke application, the square wave decoding signal developed in control mechanism 44 may be synchronized and phased with relation to the counterpart coding square wave at the transmitter by means of signal bursts transmitted along with the television signal during vertical retrace intervals. The phase modulated square wave from source 44 effects operation of audio decoder 30 during appropriate line-retrace intervals in order to realize compensating phase inversions of the coded audio during such intervals.

In the operation of the described receiver of FIGURE 1, the coded television signal is received by antenna 11, amplified in radio-frequency amplifier 10 and heterodyned to the selected intermediate frequency of the receiver in first detector 12. The resulting intermediate frequency signal is amplified in intermediate frequency amplifier 13 and detected in second detector 14 to produce a composite video signal. This latter signal is then amplified in video amplifier 15, translated through video recoder 16 and impressed on the input electrodes of image reproducer 19 to control the image intensity in conventional manner. Video decoder 16 receives from decoding signal source 44 a decoding signal which has amplitude variations occurring in exact time coincidence with amplitude variations of the coding signal applied as a deflection-control signal to the corresponding video coder in the transmitter of the aforementioned Roschke application, Serial No. 366,727, so that the video components applied to the input electrodes of image reproducer 19 are suitably compensated or unscrambled to effect faithful image reproduction.

The synchronizing components of the received signal are segregated from the composite video signal in separator 22 for application to sweep systems 23 and 24.

The vertical- or field-synchronizing components are employed to synchronize sweep system 23 and, therefore, the field-deflection of the image reproducer, while the line- or horizontal-synchronizing pulses are utilized to synchronize sweep system 24 and, thus, the line deflection of reproducer 19.

Figure 3:
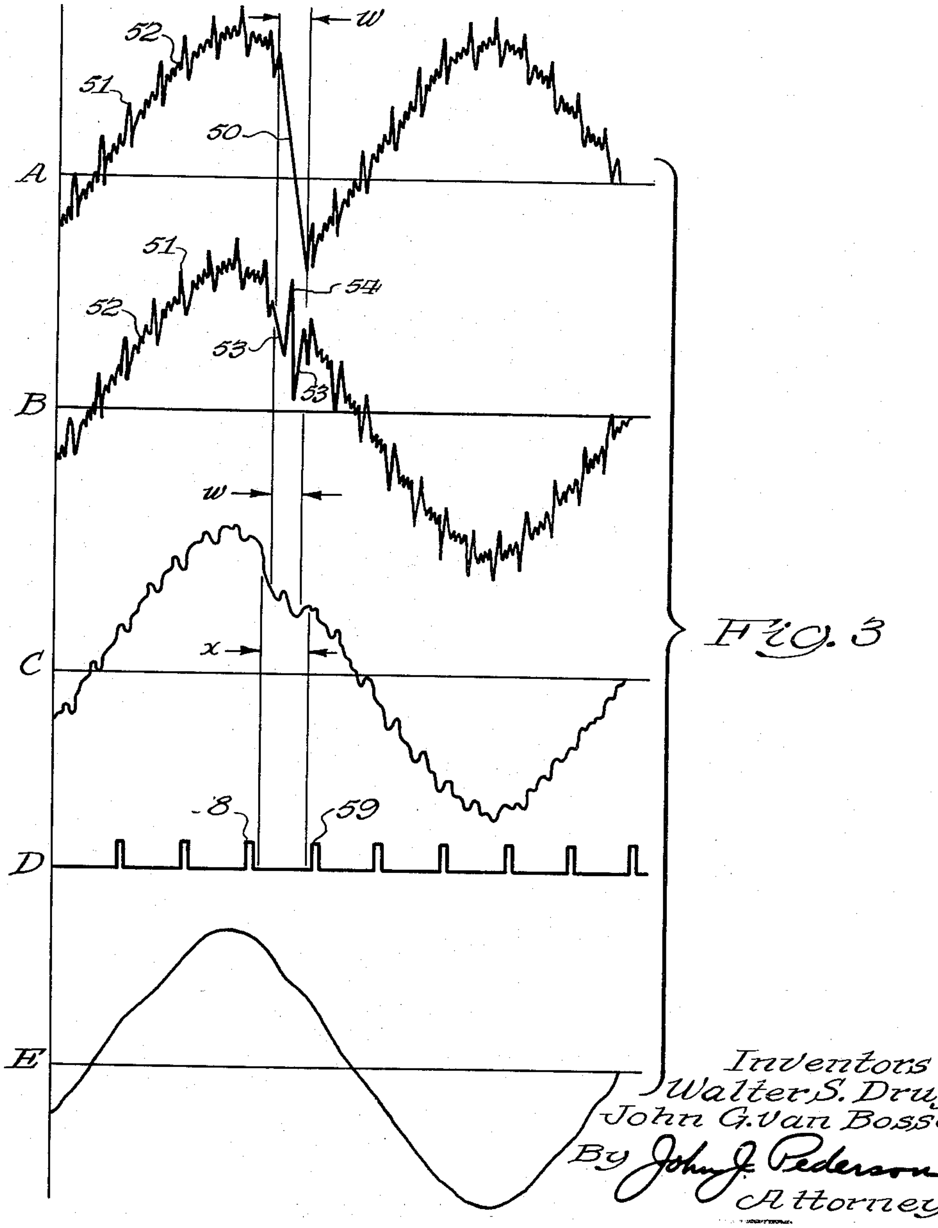
FIGURE 3 comprises a series of signal wave forms, appearing at various points in the receiver of FIGURE 1, that are helpful in explaining the operation of that receiver.

Consideration will now be given to the particular manner in which transient distortion that may otherwise result from the transmission band width limitations and the audio decoding process is eliminated while at the same time reducing the undesired noise distortion due to heterodyning effects to a negligible point in accordance with the invention. Reference is made to the wave forms of FIGURE 3 which are typical of those appearing at certain points within the audio section of the receiver, these points being indicated by encircled reference letters corresponding to the designation of the curves of FIGURE 3.

An intercarrier sound signal derived from video amplifier 15 is amplified and amplitude limited in unit 26 and detected in discriminator detector 27 to develop the coded audio signal of curve A. This signal is illustrated for convenience as primarily a sinusoidal signal wave having a frequency of approximately 2,000 cycles per second and characterized by a phase inversion 50 occurring during an interval established by the audio coding arrangement at the transmitter. Since mode changes are made in the transmitter of the Roschke application after every 15 line-trace intervals, additional phase inversions like 50 take place during mode-changing occurrences at a frequency of approximately 1,000 cycles per second under the present United States standards. Only slightly more than one complete cycle of the sine wave and only one phase inversion are depicted for convenience of illustration.

Because of transmission band width limitations, the phase inversions like 50 generally do not occur instantaneously but require a finite time interval, designated W, and therefore result in finite slope step functions as shown by the slanting rather than vertical configuration of the wave form at that time. As mentioned hereinbefore, even if the phase inversions occur instantaneously at the transmitter, it would require the transmission of an infinitely wide band width to transmit all the frequency components which represent such instantaneously abrupt phase inversions.

As also mentioned previously, while detector 27 cannot accept an infinitely wide band of frequencies, it is designed to accept a relatively wide band of frequencies as compared to the conventional discriminator detector found in the usual television receiver, in order that the phase inversions like 50 may be made as steep as possible. For example, the discriminator detector included in a conventional television receiver normally passes frequencies up to 15 kilocycles but detector 27 is preferably adjusted to translate signal components up to 40 kilocycles. There is a limit, however, to the high frequency cut-off point which may be employed, for if signal components having frequencies above approximately 40 kilocycles are accepted in an intercarrier type television system, as is presented here, there is a possibility that there will be a considerable amount of interference between the sound and video signals.

Due to the fact that detector 27 passes a relatively broad band of frequencies, certain extraneous transmission noise and low frequency video components appear in the signal of curve A. The pulses like that designated 51 represent such video components, which exhibit frequencies around 15,750 kilocycles per second and 31.5 kilocycles, and the signal components like that labeled 52 appearing between adjacent pulses 51 represent the transmission noise which may have frequencies anywhere up to 40 kilocycles. As stated before, since the video components 51 and the transmission noise components 52 are extraneous to the desired audio information, the two types may collectively be considered as noise.

In order to effect compensating phase inversions of the coded audio signal, decoding signal source 44 develops a square wave shaped decoding signal having amplitude variations occurring in time coincidence with the mode changes introduced at the transmitter and, consequently, in synchronism with the phase reversals of the received coded audio signal like that shown in curve A.

The decoding signal thus effects a phase reversal of the coded audio signal of curve A in decoder 30 to compensate for phase inversion 50 to produce at the output terminals of the decoder a decoded audio signal having the wave shape shown in curve B. Since the coded audio of curve A contains desired audio components in the audible range of the frequency spectrum but is subject to distortion as represented by the undesired relatively high frequency extraneous noise components 51, 52 lying above the audible range, those same undesired high frequency noise components also appear in the decoded signal of curve B. From an examination of the signal of curve B it will be seen that there is a "spike," "wedge" or "pie cut" 53 in the sinusoidal signal at the single mode-changing occurrence illustrated due to the prolonged rather than instantaneous phase change in the coded audio signal of curve A. The width of spike 53 in point of time is equal to the finite time interval W.

Additionally, undesirable switching transients like that designated 54 in curve B may be introduced during the decoding process. For example, if decoder 30 takes the form of a beam-deflection tube, such distortion may result from the transfer characteristic of the tube and may also be attributed to the load circuit of the tube, especially if it includes an output transformer. For convenience, transient pulse 54 along with components 51 and 52 are drawn on a reduced scale in the illustrated diagram; it will be appreciated that all of these pulses may be many times greater in amplitude than the audio intelligence signal. It should be noted that inasmuch as spike 53 and switching transient 54, which together comprise the undesired transient distortion, exhibit relatively abrupt changes, a significant proportion of this transient distortion is represented by frequency components lying above the audible range of the spectrum.

It is apparent that the distortion of the sinusoidal signal of curve B, if not eliminated, would detract from the listening quality rather considerably. The transient distortion during time interval W may be effectively eliminated quite conveniently in sampler 32 according to the teachings of Van Jepmond. However, in order to minimize the unwanted demodulation of noise components 51 and 52 in the sampler, which would otherwise occur if the signal of curve *b* were to be supplied directly thereto, low-pass filter 33 is interposed in accordance with the present invention. As mentioned previously, it has been found that by constructing filter 33 to exhibit a frequency response characteristic substantially as shown in FIGURE 2, excellent results are obtained insofar as diminishing undesirable heterodyning effects is concerned while at the same time passing enough audio components to provide a commercially acceptable audio signal.

Filter 33 attenuates the noise components to various degrees dependent on their frequencies. For example, the video noise around 15.75 kilocycles is down about 8 decibels from the response for the desired audio information, which primarily falls below 7.8 kilocycles, while the video noise at 31.5 kilocycles is down approximately 20 decibles. The signal produced in the output of filter 33 in response to the signal of curve B takes the form of that shown in curve C. It will be observed that a considerable amount of the high frequency noise has been deleted. The gradual roll-off at the high end of the frequency response curve of FIGURE 2 is preferably provided so that the filter may also exhibit a substantial linear frequency-phase characteristic. Otherwise, high frequency damped oscillations would be developed at points in the signal where there are abrupt amplitude changes.

As in any low-pass filter, when a high frequency signal is attenuated, it is effectively decreased in amplitude and broadened, spread out or widened in point of time. Consequently, it will be noted that the high frequency video noise 51, for example, is now represented in the signal of curve C by components having considerably decreased amplitudes but longer periods. Since the transient distortion comprising spike 53 and switching transient 54 is partially represented by high frequency components lying above the audible range, filter 33 also attenuates some of those components along with the attenuation of the noise components 51 and 52. Moreover, inasmuch as filter 33 inherently prolongs or spreads out a signal that is at least partially attenuated, the time interval W containing the transient distortion is broadened to the time interval designated X in curve C. In view of the fact that the construction of filter 33 does increase the time duration containing the transient distortion, there is a limit to the attenuation that may be present so that the time interval X does not exceed the time separation between sampling intervals.

Turning now to the operation of the sampling arrangement, pulse generator 36 is phased by line-drive pulses from line-sweep system 24 through delay line 35, which introduces a time delay of one-half a line-trace interval to each applied pulse, to develop the sampling pulses as shown in curve D, recurring at a 15.75 kilocycle rate, for application to sampler 32 to effect sampling at that rate. As mentioned previously, the sampling signal must have a frequency at least twice as high as the highest frequency desired to be recovered. Since it has been found that a band pass of 0–7.8 kc. as illustrated by the response curve of FIGURE 2 results in a commercially acceptable signal, sampling at 15.75 kilocycles will permit the recovery of all components in that band. It will be noted that the frequency response curve of low-pass filter 33 begins to roll off at around 7.8 kc. since audio above that point would not be recovered anyway. The attenuation above 7.8 kilocycles, of course, accounts for the sharp decrease in the heterodyning of noise in sampler 32 as compared to Van Jepmond.

Delay line 35 is provided in order that the sampling pulses of curve D occur midway between line-retrace intervals; thus, sampling will always occur during time intervals different from the mode-changing occurrences. The transient distortion occurs during such mode changing times and, of course, for that reason sampling is made at other times.

It will be noted that the attenuation effected has been limited so that the transient distortion interval W is not broadened by filter 33 to a time interval exceeding the time separation between the sampling intervals. This may be observed by comparing the time separation between pulses 58 and 59 of curve D with time interval X.

The output of the sampler is applied to wave shaping network 38, which takes the form of another low-pass filter, for shaping purposes to develop the signal shown in curve E for amplification in audio amplifier 39 and for subsequent application to speaker 41. The wave form of curve E is substantially sinusoidal without a perceptible trace of transient distortion nor low frequency audible distortion otherwise resulting from the sampling operation in the absence of filter 33. The signal of curve E is quite acceptable even to a discerning listener and constitutes a considerable improvement over the signal produced by the system described in the previous Van Jepmond application.

By way of summary, amplifier and limiter 26 and detector 27 constitutes a source of coded intelligence signal, namely, a source of coded audio signal, curve A, having desired components occupying a predetermined portion of the frequency spectrum (the audio information up to approximately 7.8 kilocycles) and subject to the introduction of undesired noise components like 51 and 52 exhibiting frequencies above the predetermined portion of the spectrum containing the desired audio intelligence. Decoding apparatus (audio decoder 30 and decoding signal source 44) is coupled to detector 27 for varying from time to time a characteristic (phase) of the coded intelligence signal between a plurality of different modes in accordance with a predetermined code schedule. A decoded intelligence signal (curve B) is therefore developed, also containing the undesired high frequency noise components 51 and 52, with the transitions during the spaced mode-changing occurrences subject to introducing undesired transient distortion occupying finite time intervals in the decoded intelligence signal (like spike 53 and switching transient 54 occurring during finite time intervals W) and partially represented by frequency components lying above the predetermined portion of the spectrum. Delay line 35, pulse generator 36, sampler 32 and wave shaping network 38 constitute sampling means coupled to the decoding apparatus for effecting sampling of the decoded intelligence signal (curve C) at a sampling rate higher than the upper frequency limit of the predetermined portion of the frequency spectrum and only at spaced sampling time intervals different from the mode-changing occurrences to develop an output signal that is a substantial simulation of the decoded intelligence signal with the undesired transient distortion 53, 54 removed except that it is subject to the unwanted heterodyning of the undesired high frequency noise components 51, 52 into the predetermined portion of the frequency spectrum due to the demodulation effect of the sampling means. In order to minimize the unwanted heterodyning of noise components 51, 52 in the sampling means, low-pass filter 33 is coupled between the decoding apparatus and the sampling means for attenuating at least some of the undesired high frequency noise components 51, 52. Some of the transient distortion components 53, 54 are also attenuated since they are represented in part by high frequencies and this gives rise to a broadening or a spreading out of the time intervals like W occupied by the transient distortion. However, low-pass filter 33 is so constructed that time interval W is not broadened to the extent that it exceeds he time separation between the sampling intervals represented by the pulses of curve D.

While a particular embodiment of the invention has been shown and described, modifications may be made, and it is intended in the appended claims to cover all such modifications as may fall within the true spirit and scope of the invention.

We claim:

1. A secrecy communication receiver comprising: a source of coded intelligence signal having desired components occupying a predetermined portion of the frequency spectrum and subject to the introduction of undesired noise components exhibiting frequencies above said predetermined portion; decoding apparatus coupled to said source for varying from time to time a characteristic of said coded intelligence signal between a plurality of different modes in accordance with a predetermined code schedule to develop a decoded intelligence signal, also containing said undesired high frequency noise components, with the transitions during the spaced mode-changing occurrences subject to introducing undesired transient distortion occupying finite time intervals in the decoded intelligence signal and partially represented by frequency components lying above said predetermined portion of the spectrum; sampling means coupled to said decoding apparatus for effecting sampling of said decoded intelligence signal at a sampling rate higher than the upper frequency limit of said predetermined portion of the frequency spectrum and only at spaced sampling time intervals different from said mode-changing occurrences to develop an output signal that is a substantial simulation of said decoded intelligence signal with the undesired transient distortion removed except that it is subject to the unwanted heterodyning of said undesired high frequency noise components into said predetermined portion of the frequency spectrum due to the demodulation effect of said sampling means; and a low-pass filter coupled between said decoding apparatus and sampling means for attenuating at least some of said undesired high frequency noise components to minimize the unwanted heterodyning of said noise components in said sampling means, some of the transient distortion components in said decoded intelligence signal also thereby being attenuated giving rise to a broadening of the time intervals occupied by said transient distortion not exceeding the time separations between said sampling intervals.

2. A secrecy communication receiver comprising: a source of coded intelligence signal, which has been previously subjected to a phase inverting coding function and converted from an uncoded intelligence signal, having desired components occupying a predetermined portion of the frequency spectrum and subject to the introduction of undesired noise components exhibiting frequencies above said predetermined portion; phase-inverting decoding apparatus coupled to said source for inverting the phase of said coded intelligence signal from time to time in accordance with a predetermined code schedule to develop a decoded intelligence signal, corresponding to said uncoded intelligence signal except that it also contains said undesired high frequency noise components, with the transitions at the phase inversion times subject to introducing undesired transient distortion occupying finite time intervals in the decoded intelligence signal and partially represented by frequency components lying above said predetermined portion of the spectrum; sampling means coupled to said phase-inverting decoding apparatus for effecting sampling of said decoded intelligence signal at a sampling rate higher than the upper frequency limit of said predetermined portion of the frequency spectrum and only at spaced sampling time intervals different from said phase inversion times to develop an output signal that is a substantial simulation of said decoded intelligence signal with the undesired transient distortion removed except that it is subject to the unwanted heterodyning of said unwanted high frequency noise components into said predetermined portion of the frequency spectrum due to the demodulation effect of said sampling means; and a low-pass filter coupled between said phase-inverting decoding apparatus and sampling means for attenuating at least some of said undesired high frequency noise components to minimize the unwanted heterodyning of said noise components in said sampling means, some of the transient distortion components in said decoded intelligence signal also thereby being attenuated giving rise to a broadening of the time intervals occupied by said transient distortion not exceeding the time separations between said sampling intervals.

3. An audio decoding arrangement for a subscription television receiver comprising: a source of coded audio signal exhibiting a number of phase inversions occurring in accordance with a predetermined code schedule and containing desired audio components falling within the audible range of the frequency spectrum and subject to distortion represented by undesired relatively high frequency extraneous noise components lying above the audible range; phase-inverting decoding apparatus coupled to said source for reinverting the phase of said coded audio signal at phase inversion times determined by said predetermined code schedule to develop a decoded audio signal, also containing said undesired high frequency noise components, with the transitions at the phase inversion times subject to introducing undesired transient distortion occupying finite time intervals in the decoded audio signal and partially represented by frequency components lying above said audible range; sampling means coupled to said phase-inverting decoding apparatus for effecting sampling of said decoded audio signal at a sampling rate higher than the upper frequency limit of said audible range and only at spaced sampling time intervals different from said phase inversion times to develop an output signal that is a substantial simulation of said decoded audio signal with the desired transient distortion removed except that it is subject to the unwanted heterodyning of said undesired high frequency noise components into said audible range due to the demodulation effect of said sampling means to constitute undesired audible distortion; and a low-pass filter coupled between said phase-inverting decoding apparatus and sampling means for attenuating at least some of said undesired high frequency noise components to minimize the unwanted heterodyning of said noise components in said sampling means, some of the transient distortion components in said decoded audio signal also thereby being attenuated giving rise to a broadening of the time intervals occupied by said transient distortion not exceeding the time separations between said sampling intervals.

4. A secrecy communication receiver comprising: a source of coded intelligence signal having desired components occupying a predetermined portion of the frequency spectrum and subject to the introduction of undesired noise components exhibiting frequencies above said predetermined portion; decoding apparatus coupled to said source for varying from time to time a characteristic of said coded intelligence signal between a plurality of different modes in accordance with a predetermined code schedule to develop a decoded intelligence signal, also containing said undesired high frequency noise components, with the transitions during the spaced mode-changing occurrences subject to introducing undesired transient distortion occupying finite time intervals in the decoded intelligence signal and partially represented by frequency components lying above said predetermined portion of the spectrum; sampling means coupled to said decoding apparatus for effecting sampling of said decoded intelligence signal at a sampling rate higher than the upper frequency limit of said predetermined portion of the frequency spectrum and only at spaced sampling time intervals different from said mode-changing occurrences to develop an output signal that is a substantial simulation of said decoded intelligence signal with the undesired transient distortion removed except that it is subject to the unwanted heterodyning of said undesired high frequency noise components into said predetermined portion of the frequency spectrum due to the demodulation effect of said sampling means; and a low-pass filter, exhibiting a frequency-response characteristic that is substantially flat throughout said predetermined portion of the frequency spectrum and rolls off gradually at its high end, coupled between said decoding apparatus and sampling means for attenuating at least some of said undesired high frequency noise components to minimize the unwanted heterodyning of said noise components in said sampling means, some of the transient distortion components in said decoded intelligence signal also thereby being attenuated giving rise to a broadening of the time intervals occupied by said transient distortion not exceeding the time separations between said sampling intervals.

5. A secrecy communication receiver comprising: a source of coded intelligence signal having desired components occupying a predetermined portion of the frequency spectrum and subject to the introduction of undesired noise components exhibiting frequencies above said predetermined portion; decoding apparatus coupled to said source for varying from time to time a characteristic of said coded intelligence signal between a plurality of different modes in accordance with a predetermined code schedule to develop a decoded intelligence signal, also containing said undesired high frequency noise components, with the transitions during the spaced mode-changing occurrences subject to introducing undesired transient distortion occupying finite time intervals in the decoded intelligence signal and partially represented by frequency components lying above said predetermined portion of the spectrum; sampling means coupled to said decoding apparatus for effecting sampling of said decoded intelligence signal at a sampling rate higher than the upper frequency of said predetermined portion of the frequency spectrum and only at spaced sampling time intervals different from said mode-changing occurrences to develop an output signal that is a substantial simulation of said decoded intelligence signal with the undesired transient distortion removed except that it is subject to the unwanted heterodyning of said undesired high frequency noise components into said predetermined portion of the frequency spectrum due to the demodulation effect of said sampling means; and a low-pass filter, exhibiting a frequency-response characteristic that is substantially flat throughout said predetermined portion of the frequency spectrum and rolls off gradually at its high end and also exhibiting a substantially linear frequency-phase characteristic, coupled between said decoding apparatus and sampling means for attenuating at least some of said undesired high frequency noise components to minimize the unwanted heterodyning of said noise components in said sampling means, some of the transient distortion components in said decoded intelligence signal also thereby being attenuated giving rise to a broadening of the time intervals occupied by said transient distortion not exceeding the time separations between said sampling intervals.

6. A secrecy communication receiver comprising: a source of coded intelligence signal having desired components occupying a predetermined portion of the frequency spectrum and subject to the introduction of undesired noise components exhibiting frequencies above said predetermined portion; decoding apparatus coupled to said source for varying from time to time a characteristic of said coded intelligence signal between a plurality of different modes in accordance with a predetermined code schedule to develop a decoded intelligence signal, also containing said undesired high frequency noise components, with the transitions during the spaced mode-changing occurrences subject to introducing undesired transient distortion occuping finite time intervals in the decoded intelligence signal and partially represented by frequency components lying above said predetermined portion of the spectrum; sampling means coupled to said decoding apparatus for effecting sampling of said decoded intelligence signal at a sampling rate at least twice as high as the upper frequency of said predetermined portion of the frequency spectrum and only at spaced sampling time intervals different from said mode-changing occurrences to develop an output signal that is a substantial simulation of said decoded intelligence signal with the undesired transient distortion removed except that it is subject to the unwanted heterodyning of said undesired high frequency noise components into said predetermined portion of the frequency spectrum due to the demodulation effect of said sampling means; and a low-pass filter, exhibiting a frequency response characteristic that is substantially flat throughout said predetermined portion of the frequency spectrum and rolls off gradually at its high end starting at approximately the upper frequency limit of said predetermined portion, coupled between said decoding apparatus and sampling means for attenuating at least some of said undesired high frequency noise components to minimize the unwanted heterodyning of said noise components in said sampling means, some of the transient distortion components in said decoded intelligence signal also thereby being attenuated giving rise to a broadening of the time intervals occupied by said transient distortion not exceeding the time separations between said sampling intervals.

References Cited in the file of this patent

UNITED STATES PATENTS

| | | |
|---|---|---|
| 2,479,338 | Gabrilovitch | Aug. 16, 1949 |
| 2,579,302 | Carbrey | Dec. 18, 1951 |
| 2,709,218 | Gabrilovitch | May 24, 1955 |

OTHER REFERENCES

Appendix before the Federal Communications Commission in the Matter of: Amendment of Part 3 of the Commissions Rules and Regulations to Provide for Subscription Television Service. (Appendix to Comments of Zenith Radio Corp. and Teco Inc.) pages 6–15.